US009895810B2

(12) United States Patent
Nishi et al.

(10) Patent No.: US 9,895,810 B2
(45) Date of Patent: Feb. 20, 2018

(54) COOPERATION SYSTEM HAVING MACHINE TOOL AND ROBOT

(71) Applicant: FANUC CORPORATION, Minamitsuru-gun, Yamanashi (JP)

(72) Inventors: Hiroji Nishi, Yamanashi (JP); Jun Mizuno, Yamanashi (JP); Masahiro Oyamada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 41 days.

(21) Appl. No.: 14/952,062

(22) Filed: Nov. 25, 2015

(65) Prior Publication Data

US 2016/0151915 A1  Jun. 2, 2016

(30) Foreign Application Priority Data

Nov. 28, 2014 (JP) .................................. 2014-242393

(51) Int. Cl.
*B25J 11/00* (2006.01)
*B25J 9/16* (2006.01)
*B25J 19/02* (2006.01)

(52) U.S. Cl.
CPC ........... *B25J 9/1692* (2013.01); *B25J 9/1697* (2013.01); *B25J 19/023* (2013.01); *Y10S 901/02* (2013.01)

(58) Field of Classification Search
CPC ...... B25J 9/1692; B25J 9/1697; B25J 9/1694; B25J 15/0019; Y10S 901/02;
(Continued)

(56) References Cited

U.S. PATENT DOCUMENTS 6,615,112 B1 * 9/2003 Roos ...................... B25J 9/1692
318/568.1
6,681,151 B1 * 1/2004 Weinzimmer ......... B25J 9/1697
219/121.85
(Continued)

FOREIGN PATENT DOCUMENTS

JP       59177607       10/1984
JP       05212652       8/1993
(Continued)

OTHER PUBLICATIONS

JPO Notification of Reasons for Refusal issued in Japanese Patent Application No. 2014-242393 dated Sep. 6, 2016 (6 pages).

*Primary Examiner* — Dalena Tran
(74) *Attorney, Agent, or Firm* — RatnerPrestia

(57) ABSTRACT

A cooperation system of a robot and a machine tool, capable of obtaining a coordinate transformation means with high accuracy by a simple configuration, by which a robot coordinate system is transformed to a machine coordinate system. A provisional coordinate system is defined by coordinate values of three calibration markers in a base coordinate system obtained by translating the machine coordinate system, and a coordinate transformation matrix from the provisional coordinate system to the base coordinate system is calculated. The positions of the markers in the robot coordinate system are obtained by capturing the markers by a camera. Based on the three coordinate values in the robot coordinate system, a coordinate transformation matrix from the robot coordinate system to the provisional coordinate system is calculated, and a coordinate transformation matrix from the robot coordinate system to the base coordinate system is calculated based on the above two matrixes.

3 Claims, 10 Drawing Sheets

(58) Field of Classification Search
CPC .... Y10S 901/09; Y10S 901/14; Y10S 901/47;
G05B 2219/39022; G05B 2219/39008;
G05B 2219/39016; G05B 2219/40607
USPC ...... 700/251, 254, 114, 259, 247; 901/2, 14,
901/6, 47; 318/568.12, 568.16, 568.19,
318/568.22
See application file for complete search history.

(56) References Cited

U.S. PATENT DOCUMENTS

| | | | |
|---|---|---|---|
| 8,155,789 B2 * | 4/2012 | Nagatsuka | B25J 9/1656 219/124.34 |
| 2003/0120377 A1 | 6/2003 | Hooke et al. | |
| 2008/0154428 A1 | 6/2008 | Nagatsuka et al. | |
| 2016/0059419 A1 * | 3/2016 | Suzuki | B25J 9/1697 700/114 |

FOREIGN PATENT DOCUMENTS

| | | |
|---|---|---|
| JP | 05324034 | 12/1993 |
| JP | 08-229774 | 9/1996 |
| JP | 11509928 | 8/1999 |
| JP | 2005-138223 | 6/2005 |
| JP | 2008152733 | 7/2008 |
| JP | 2009279677 | 12/2009 |
| JP | 2011-048467 | 3/2011 |
| JP | 2013-503380 A | 1/2013 |
| WO | 2011/023932 A1 | 3/2011 |

* cited by examiner

COOPERATION SYSTEM HAVING MACHINE TOOL AND ROBOT

BACKGROUND OF THE INVENTION

1. Field of the Invention

The preset invention relates to a cooperation system, in which a robot is operated with respect to a machine tool.

2. Description of the Related Art

When a robot is operated with respect to a machine tool, the robot may carry out an operation such as exchanging a tool, cleaning chips, checking an inside of the machine tool, etc., as well as handling an object to be processed. When the operation of the robot is only handlings of an object, it is normal that a plurality of (normally, three or four) teaching points on the object in the machine tool are obtained, and a coordinate transformation matrix from a robot coordinate system to an object coordinate system (or a machine coordinate system) is calculated, by using the position of a tool center point of the robot.

For example, JP S59-177607 A discloses an automatic programming method for automatically generating a robot program from a program of a machine tool, by connecting the machine tool to a robot and by using a conversion equation between a coordinate system with respect to the robot and a coordinate system with respect to the machine tool.

JP H05-212652 A discloses a precision processing machine having a process zone and a measurement zone, and having a first calculation means for calculating a coordinate transformation matrix based on measurement data; a second calculation means for converting the measurement data by using the calculated transformation matrix; a judgment means for judging shape accuracy of calculated shape data; a correction means for automatically correcting NC data; and a process execution means for carry out processing again based on the corrected NC data.

JP H05-324034 A discloses a method for controlling a robot, in which a supervisory computer of a machine tool for carrying out NC control transmits motion control data to a robot controller, so that the robot exchanges or moves a workpiece or a tool of the machine tool.

JP 2008-152733 A discloses an offline programming device for generating an operation program, in which the position and orientation of an object on a machine tool during handling operation are calculated based on a command for specifying the position of the object in a work processing program given to the machine tool, and the position and orientation of the robot are calculated during the handling operation based on a predetermined positional relationship.

JP H11-509928 A discloses a device and a method for generating a three-dimensional model of an object, by using a probe attached to a robot so as to obtain a coordinate system of the robot relative to a robot coordinate system. This document also describes that the three-dimensional model of the object is generated by obtaining a coordinate value of the object based on a plurality of images obtained by moving a camera attached to a front end of the robot and capturing the object by the camera.

JP 2009-279677 A discloses a robot controller configured to automatically correct a teaching position by moving a robot or an object to be worked so as to obtain a desired positional relationship, without calibrating a measurement device such as a camera.

In the prior art, the coordinate transformation between a robot coordinate system and a machine coordinate system is mainly used for handling an object to be processed. For example, JP S59-177607 A discloses a method using the robot so as to easily generate a handling program of the object to be processed by the machine tool, and JP H05-324034 A discloses a method for easily commanding the robot by using the supervisory computer, so that the robot carries out handling of the object to be processed by the machine tool and attachment/detachment of the tool. However, although the coordinate transformation is carried out in JP S59-177607 A or JP H05-324034 A, a concrete method for obtaining a means for the coordinate transformation is not described in these documents.

In JP H05-212652 A, an amount of processing of the machine tool is corrected by using the difference between a measured surface of an object to be processed and an ideal curved surface, and the coordinate transformation from a coordinate system defined corresponding to the measurement device and a coordinate system defined at a determined position of the machine tool. However, a concrete method for obtaining a means for the coordinate transformation from the coordinate system regarding the measurement device to the coordinate system regarding the machine tool is not described in this document.

In JP 2008-152733 A, in order to obtain a coordinate system common to the robot and the machine tool, a position detector is attached to a front end of the robot, a target to be detected is attached to a table of the machine tool, the position of the front end of the robot is fixed, and the position of the target is detected at the different three positions. Concretely, first, a reference position of the target is determined, and the target is detected at the reference position. Second, the table is moved in the direction of a reference axis, and the target is detected. Third, the target is moved in the direction of a different reference axis, and the target is detected. Based on a coordinate transformation matrix calculated from the obtained three measurement values and a simulation result of by an offline simulation device, the robot is calibrated. However, in this method, it is necessary to prepare a high-precision three-dimensional CAD model used in the offline simulation device. Further, a positional error between the actual robot and the actual machine tool may be included in the calculation of the offline simulation device.

Further, in the method of JP H05-324034 A or JP 2008-152733 A, it is necessary to use the supervisory computer or the offline simulation device, as well as the robot and the machine tool, whereby a cost of a factory including the same may be high.

In addition, when the task of the robot for the machine tool includes an operation other than the handling of the object to be processed, it is necessary that the robot can access or approach another area of the machine tool, as well as the object. In such a case, there are many limitations in the location of the robot.

As described above, when the task of the robot includes various operations other than the handling of the object to be processed and these operations should be automated, it is insufficient that the robot merely has coordinate information for the operation near the object.

SUMMARY OF THE INVENTION

Therefore, an object of the present invention is to provide a cooperation system of a robot and a machine tool, capable of obtaining a coordinate transformation means with high accuracy by a simple configuration, by which a robot coordinate system defined with respect to the robot is transformed to a machine coordinate system defined with respect to a predetermined position of the machine tool.

According to the present invention, there is provided a cooperation system including a machine tool and a robot for carrying out an operation with respect to the machine tool, the cooperation system comprising: a camera attached to a movable portion of the robot; at least one calibration marker arranged on the machine tool; a first marker coordinate obtaining part which obtains a first coordinate value of the calibration marker in a machine coordinate system defined with respect to the machine tool; a second marker coordinate obtaining part which obtains a second coordinate value of the calibration marker in a robot coordinate system defined with respect to the robot, by capturing the calibration marker by the camera; and a coordinate transforming part which calculates a coordinate transformation means for transforming a robot coordinate system to the machine coordinate system, based on a plurality of sets of the first and second coordinate values of the calibration marker.

In a preferred embodiment, the calibration marker is attached to a movable portion of the machine tool, wherein the first marker coordinate obtaining part obtains a plurality of first coordinate values of the calibration marker in the machine coordinate system, with respect to a plurality of positions of the movable portion of the machine tool, respectively, and wherein the second marker coordinate obtaining part obtains a plurality of second coordinate values of the calibration marker in the robot coordinate system, by capturing the calibration marker at the plurality of positions of the movable portion of the machine tool, respectively.

In a preferred embodiment, the robot is automatically controlled so as to determine a positional relationship between the camera and the calibration marker, in which the camera can measure the position of the calibration marker.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Hereinafter, preferred embodiments will be explained with reference to the drawings. Herein, the term "coordinate transformation means" refers to a transformation matrix or a rotation matrix for carrying out coordinate transformation as described below. Further, the coordinate transformation matrix may include a vector and a scalar quantity for defining the above matrix, or a calculus equation for carrying out calculation process equivalent to the coordinate transformation using the above matrix.

Herein, the term "calibration marker" refers to a print or feature such as a mark or indent, positioned or formed on a predetermined position of a machine tool, and the print or feature is capable of being detected by a camera attached to a robot. By capturing the calibration marker by the camera, the position (or a measure value) of the calibration marker in a robot coordinate system can be obtained.

In embodiments as explained below, a function of a first marker coordinate obtaining part is provided to a controller of the machine tool, and functions of a second marker coordinate obtaining part and a coordinate transforming part are provided to a robot controller. However, the present invention is not limited to such a configuration.

Figure 1:
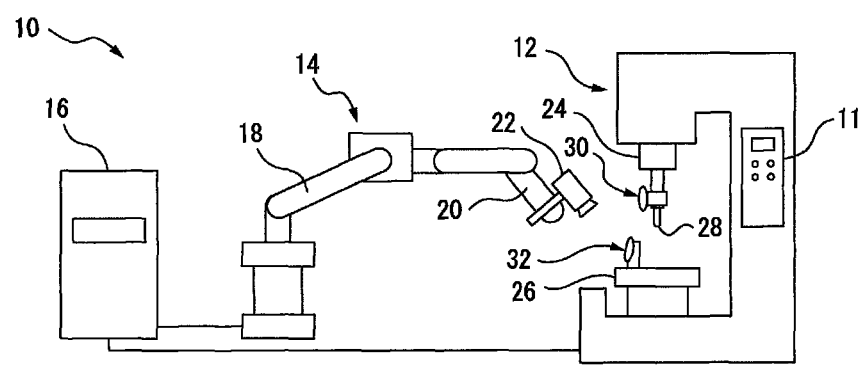
FIG. 1 is a view showing a schematic configuration of a cooperation system according to a first embodiment of the present invention.

FIG. 1 shows a schematic configuration of a cooperation system according to a first embodiment of the present invention. Cooperation system 10 includes a machine tool 12 controlled by a controller 11 such as numerical controller; a robot 14 configured to carry out an operation with respect to machine tool 12, such as handling of an object to be processed by machine tool 12; and a robot controller 16 configured to control the motion of robot 14. Cooperation system 10 has a function for setting a machine coordinate system to robot controller 16, as describe below.

For example, robot 14 is a multi-joint robot having six axes, and has a movable portion such as an arm 18 or a hand 20 attached to a front end of arm 18, and a camera 26 attached to the movable portion (preferably, a front end of hand 20). Controller 11 of machine tool 12 may be arranged separated from a housing of machine tool 12, or may be formed integrally with the housing or a robot controller 16.

On the other hand, machine tool 12 has a spindle 24 configured to grip a tool and rotate about a center axis (in the generally vertical direction in the drawing), and movable in the direction of the center axis; a movable portion 26 (in the drawing, a table on which an object (or a workpiece) to be processed by machine tool 12 can be mounted) movable at least in a plane perpendicular to the direction of the center axis of spindle 24. The tool attached to spindle 24 can be replaced with a measurement probe 28 (for example, a contact-type probe), and a first calibration marker 30 is arranged on a portion of spindle 24 in the vicinity of measurement probe 28. Further, a second calibration marker 32 is arranged on table 26.

In the first embodiment, following definitions or conditions (a1) to (a6) are predetermined.

Figure 2:
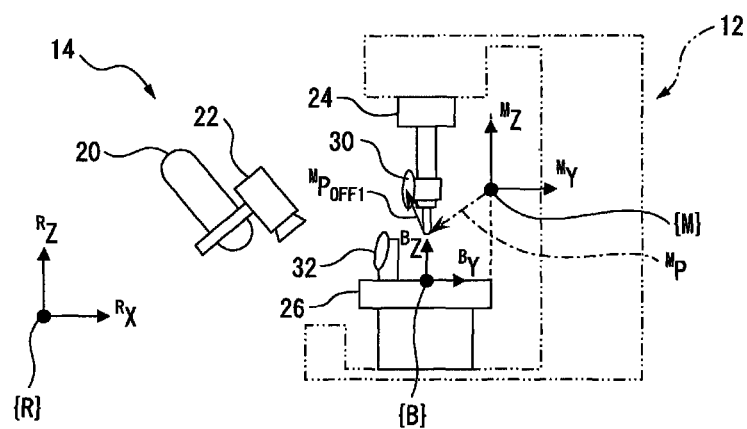
FIG. 2 is a view showing a state of the cooperation system of FIG. 1, in which each coordinate system is defined.

(a1) As shown in FIG. 2, a (machine) coordinate system defined with respect to machine tool 12 is referred to as $\{M\}$, and a (robot) coordinate system defined with respect to robot 14 is referred to as $\{R\}$.

(a2) Although each of machine coordinate system $\{M\}$ and robot coordinate system $\{R\}$ is an orthogonal (Cartesian) coordinate system including three axes (x, y, z) orthogonal to each other. However, coordinate system $\{M\}$ and/or $\{R\}$ may be a polar coordinate system. In machine coordinate system $\{M\}$ as shown in FIG. 2, the X-axis is perpendicular to the drawing sheet, the Y-axis extends in the right-left (horizontal) direction, and the Z-axis extends in the up-down (vertical) direction. On the other hand, in robot coordinate system $\{R\}$, the X-axis extends in the right-left (horizontal) direction, the Y-axis is perpendicular to the drawing sheet, and the Z-axis extends in the up-down (vertical) direction.

(a3) The origin of machine coordinate system $\{M\}$ is fixed to table 26. Regarding the position of the origin (x, y, z), the position of a far-left and back corner of table 26 viewed from robot 14 (see FIG. 9) is defined as (x, y)=(0, 0), and the z-coordinate of the origin is zero (z=0) when a tool center point (TCP) of a tool (not shown) attached to spindle 24 is positioned at a tool exchange position. However, the position of the origin and the direction of the reference axes are not limited as described above.

(a4) Each of machine coordinate system $\{M\}$, robot coordinate system $\{R\}$, and a camera coordinate system defined with respect to camera 22 is previously calibrated. In addition, the positional relationship between robot coordinate system $\{R\}$ and the camera coordinate system (a coordinate transformation means) is previously known or calculated.

(a5) As shown in FIG. 2, a machine base coordinate system $\{B\}$ is defined with respect to a predetermined position of machine tool 12 (for example, table 26), in order to facilitate the calculation. As exemplified in FIG. 2, machine base coordinate system (hereinafter, also referred as merely base coordinate system) $\{B\}$ has the origin at an intersection point between the center axis of spindle 24 and an (upper) surface of table 26, and the direction of each reference axis (x, y, z) of base coordinate system $\{B\}$ coincides with respective axis of machine coordinate system $\{M\}$. In other words, base coordinate system $\{B\}$ is obtained by translating machine coordinate system $\{M\}$.

(a6) Measurement probe 28 and first calibration marker 30 can be simultaneously used.

Next, under the above definitions or conditions, a procedure for obtaining a coordinate transformation matrix T for carrying out coordinate transformation from robot coordinate system $\{R\}$ to base coordinate system $\{B\}$ in cooperation system 10 will be explained, with reference to FIGS. 1 to 10.

Figure 3:
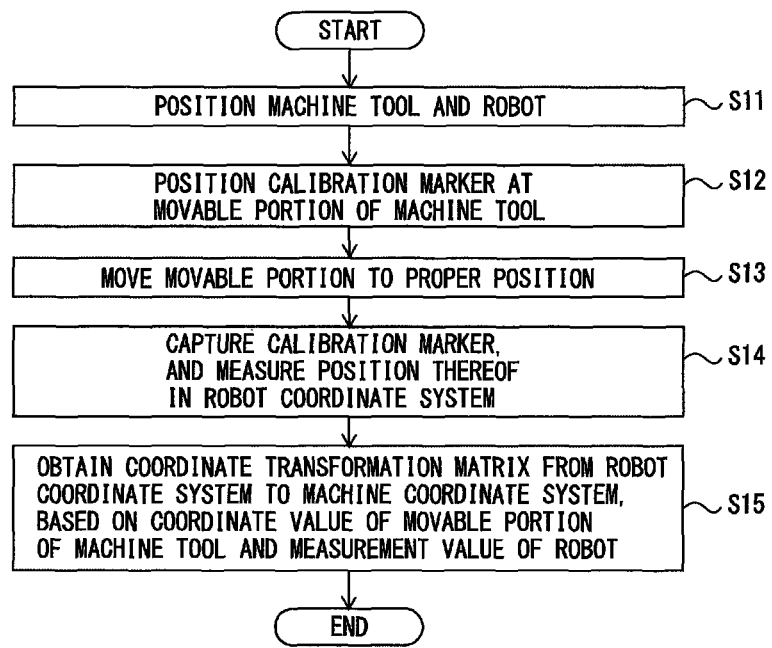
FIG. 3 is a flowchart showing an example of a procedure in the first embodiment.

First, as shown in FIG. 1, machine tool 12 and robot 14 are positioned at predetermined positions (step S11 in FIG. 3). Then, first calibration marker 30 is attached to spindle 24, and second calibration marker 32 is attached to table 26 (or the movable portion of machine tool 12) (step S12 in FIG. 3).

Figure 4:
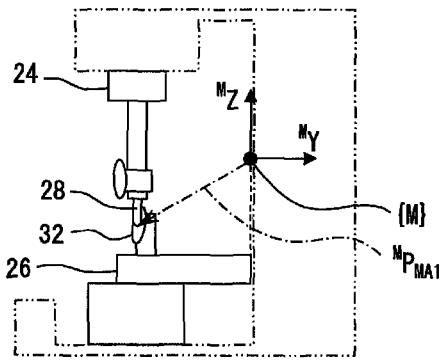
FIG. 4 is a view showing a state of the cooperation system of FIG. 1, in which the position of a second calibration marker is measured by a measurement probe.

Next, as shown in FIG. 4, the position of second calibration marker 32 attached to table 26 is measured by measurement probe 28 attached to spindle 24 of machine tool 12 (concretely, at least one of probe 28 and table 26 is moved so that probe 28 comes into contact with second calibration marker 32). Due to this measurement, a position $^{M}P_{MA1}$ (or a first coordinate value) of second calibration marker 32 in machine coordinate system $\{M\}$ is obtained.

Figure 5:
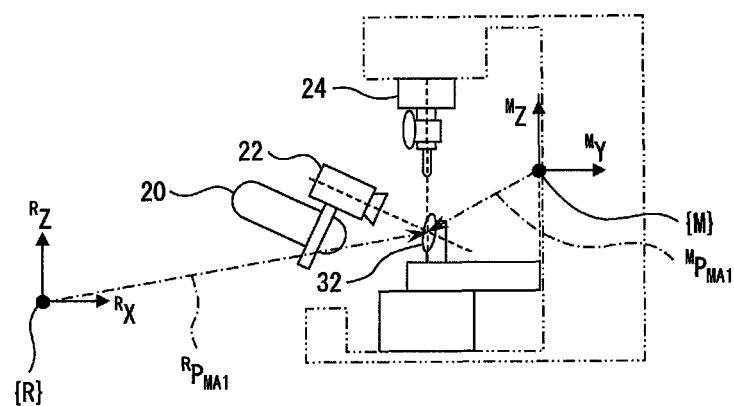
FIG. 5 is a view showing a state of the cooperation system of FIG. 1, in which the position of the second calibration marker is measured by a camera.

Next, as shown in FIG. 5, second calibration marker 32 is captured by camera 22 arranged on robot 14 after upwardly moving spindle 24 (concretely, robot 14 is controlled so that second calibration marker 32 is positioned within a field of view of camera 22 and the position of marker 32 can be measured with sufficient accuracy). Due to this process, a position $^{R}P_{MA1}$ (or a second coordinate value) of second calibration marker 32 in robot coordinate system $\{R\}$ is obtained.

Next, under the condition in which coordinate transformation matrix T from robot coordinate system $\{R\}$ to base coordinate system $\{B\}$ is unknown, x and y components of an offset $^{M}P_{OFF1}=(P_{xOFF1}, P_{yOFF1}, P_{zOFF1})$ based on machine coordinate system $\{M\}$ (see FIG. 2), from the position of the tool center point (TCP) to the center point of first calibration marker 30, are measured by using robot 14. Hereinafter, the procedure thereof will be explained in detail.

Figure 6:
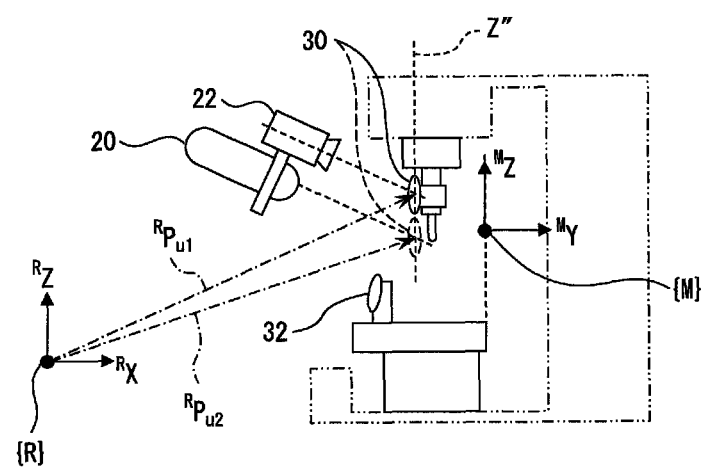
FIG. 6 is a view showing a state of the cooperation system of FIG. 1, in which the position of a first calibration marker is measured by the camera.

As shown in FIG. 6, first, after spindle 24 is moved to an arbitrary position, first calibration marker 30 is captured by camera 22 so as to measure (obtain) first position $^{R}P_{u1}$ in robot coordinate system $\{R\}$. Then, after spindle 24 is moved to another arbitrary position, first calibration marker 30 is captured by camera 22 so as to measure (obtain) second position $^{R}P_{u2}$ in robot coordinate system $\{R\}$. Based on first position $^{R}P_{u1}$ and second position $^{R}P_{u2}$, (an equation of) a straight line (a Z"-axis in the drawing) passing through these positions in robot coordinate system $\{R\}$ is obtained.

Figure 7:
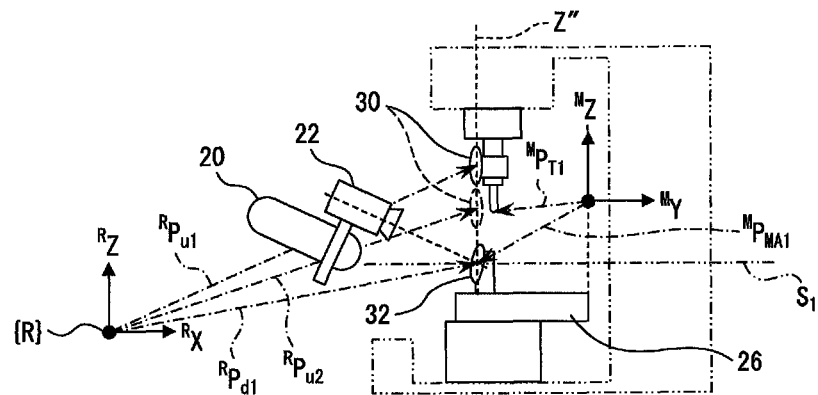
FIG. 7 is a view explaining a process for calculating the difference (offset) between the first calibration marker and a tool center point.

Next, as shown in FIG. 7, a plane $S_1$ is calculated in robot coordinate system $\{R\}$, so that plane $S_1$ is orthogonal to the straight line (Z"-axis) passing through first position $^{R}P_{u1}$ and second position $^{R}P_{u2}$, and includes position $^{R}P_{MA1}$ of second calibration marker 32 in robot coordinate system {R}. Then, an intersection point between plane $S_1$ and the straight line passing through first position $^{R}P_{u1}$ and second position $^{R}P_{u2}$ is defined as a point $^{R}P_{d1}$. Camera 22 is moved so that camera 22 can capture point $^{R}P_{d1}$ (preferably, point $^{R}P_{d1}$ is positioned at the center of the field of view of camera 22).

Next, table 26 is moved so that point $^{R}P_{d1}$ and the center position of second calibration marker 32 are overlapped with each other. At this stage, since coordinate transformation matrix T is not obtained at this stage, the direction of movement of table 26 cannot be uniquely determined. In this regard, the difference between position $^{M}P_{MA1}$ of second calibration marker 32 in machine coordinate system {M} and point $^{R}P_{d1}$ in robot coordinate system {R} is very short. Therefore, when second calibration marker 32 is captured by camera 22 after moving table 26 from the x- and y-coordinates of position $^{M}P_{MA1}$ by a small distance, it can be judged as to whether or not the center of second calibration marker 32 approaches point $^{R}P_{d1}$ in robot coordinate system {R}. Due to such a manner, by moving table 26 to the arbitrary position and measuring a change in position of second calibration marker 32 by camera 22, an amount of change in measurement position and the movement direction of table 26 can be properly corrected, and table 26 can be moved so that the measurement position of second calibration marker 32 obtained by camera 22 coincides with point $^{R}P_{d1}$.

As shown in FIG. 7, when the measurement position of second calibration marker 32 obtained by camera 22 coincides with point $^{R}P_{d1}$, the position of the tool center point in machine coordinate system {M} is defined as a point $^{M}P_{T1}$. By calculating a difference between point $^{M}P_{T1}$ and position $^{M}P_{MA1}$ of second calibration marker 32, the x- and y-components ($P_{xOFF1}$, $P_{yOFF1}$) of the above offset $^{M}P_{OFF1}$ is obtained.

Figure 8:
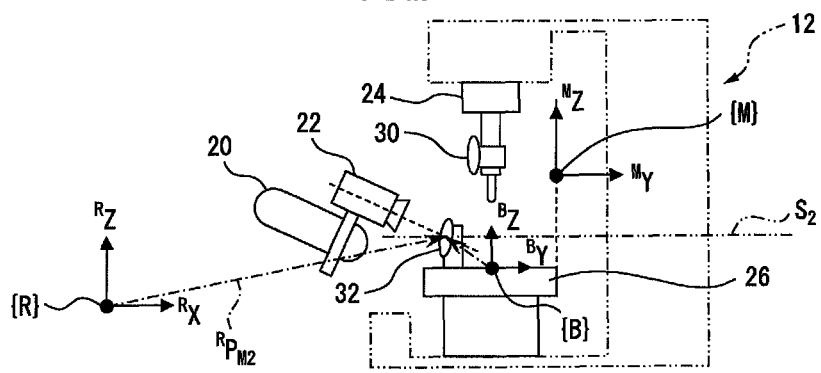
FIG. 8 is a view showing a state of the cooperation system of FIG. 1, in which the position of the second calibration marker is measured by the camera.

Next, as shown in FIG. 8, in machine tool 12, the movable portion (table 26 in this case) is moved to an arbitrary position (step S13 in FIG. 3). In this regard, the center of second calibration marker 32 is not overlapped with the center axis of spindle 24. At this point, by using coordinate value $^{M}P_{MA1}$ of second calibration marker 32 in machine coordinate system {M}, the position of second calibration marker 32 in machine coordinate system {M} is transformed to a coordinate value in base coordinate system {B}, and a transformed coordinate value $^{B}P_{M2}$ is obtained. Coordinate value $^{B}P_{M2}$ is transmitted to robot controller 16 by using a proper means.

Then, robot 14 is operated by robot controller 16 so that the distance between second calibration marker 32 attached to table 26 and camera 22 attached to the front end of robot 14 becomes appropriate, and the position of second calibration marker 32 can be measured with sufficient accuracy. After that, second calibration marker 32 is captured by camera 22, and the position (or the measurement value) $^{R}P_{M2}$ of second calibration marker 32 in robot coordinate system {R} is obtained (step S14 in FIG. 3).

In this regard, a straight line (see FIG. 7) passing through first position $^{R}P_{u1}$ and second position $^{R}P_{u2}$ of first calibration marker 30 in robot coordinate system {R} is defined as a provisional Z"-axis, and a plane $S_2$ is calculated so that plane $S_2$ is orthogonal to Z"-axis and includes position $^{R}P_{M2}$. Then, an intersection point between plane $S_2$ and Z"-axis is defined as the origin, and a direction from the origin to point $^{R}P_{u1}$ is defined as +Z direction.

Figure 9:
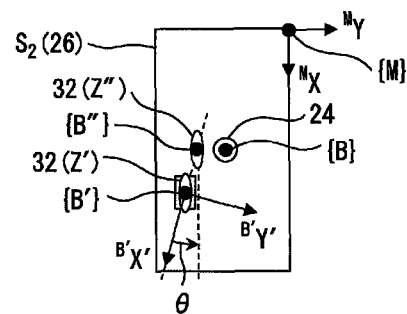
FIG. 9 is a view explaining a process for calculating a coordinate transformation matrix from a robot coordinate system to a machine coordinate system in the first embodiment.

Next, as shown in FIG. 9, a provisional X'-axis is defined so that a positive direction thereof is from the origin of plane $S_2$ to position $^{R}P_{M2}$ of second calibration marker 32, and a provisional coordinate system {B'} is defined by X'-axis, a Y'-axis extending along plane $S_2$ and orthogonal to X'-axis, and a Z'-axis orthogonal to both X'- and Y'-axes. By virtue of this, a coordinate transformation matrix T' from robot coordinate system {R} to coordinate system {B'} can be obtained. However, the method for defining coordinate system {B'} is not limited as described above.

Then, a position vector is calculated so that the position vector corresponds to the difference between x- and y-components of position $^{B}P_{M2}$ of second calibration marker 32 in base coordinate system {B} and x- and y-components ($P_{xOFF1}$, $P_{yOFF1}$) of the above offset $^{M}P_{OFF1}$. Further, a rotational transformation matrix $^{B}R$, for rotating the position vector by an angle θ so that the position vector is overlapped with +X direction of base coordinate system {B}, is calculated.

In this regard, as shown in FIG. 9, Z'-axis of provisional coordinate system {B'} is parallel to the straight line (Z"-axis) passing through first position $^{R}P_{u1}$ and second position $^{R}P_{u2}$ of first calibration marker 30. A coordinate transformation matrix T" is calculated based on coordinate transformation matrix T' and rotational transformation matrix $^{B}R$, and a coordinate system {B"} is obtained by transforming robot coordinate system {B} by using coordinate transformation matrix T". An x-y plane of coordinate system {B"} is overlapped with a plane of base coordinate system {B}, and coordinate system {B"} and base coordinate system {B} are in parallel relationship. Further, a translational distance between coordinate systems {B"} and {B} is represented by x- and y-components of coordinate value $^{B}P_{M2}$. Therefore, by using coordinate value $^{B}P_{M2}$, a coordinate transformation matrix T'" for parallel translation from coordinate system {B"} to base coordinate system {B} can be obtained.

In view of the above, coordinate transformation matrix T from robot coordinate system {R} to base coordinate system {B} can be calculated, based on coordinate transformation matrix T" (i.e., coordinate transformation matrix T' and rotational transformation matrix $^{B}R$) and coordinate transformation matrix T'" (step S15 in FIG. 3). Since base coordinate system {B} and machine coordinate system {M} are in parallel relationship, a coordinate transformation matrix from robot coordinate system {R} to machine coordinate system {M} can be easily calculated, after coordinate transformation matrix T is calculated.

In the first embodiment, coordinate transformation matrix T can be obtained by using: the measurement values of arbitrary two positions of first calibration marker 30 attached to spindle 24 in robot coordinate system {R}; the amount of offset of the x- and y-components of one of the above two arbitrary positions relative to the center axis (or the Z-axis) of spindle; and one measurement value of second calibration marker 32 on table 26 in each of robot coordinate system {R} and base coordinate system {B}. As explained above, it is sufficient that the arbitrary one position on table 26 is measured, and thus an allocable area for robot 14 can be enlarged. Further, it is sufficient that first calibration marker 30 is fixed to spindle 24, and thus the degree-of-freedom of the design of the system can be improved.

Next, a second embodiment of the present invention will be explained, with reference to FIGS. 10 to 12.

Figure 10:
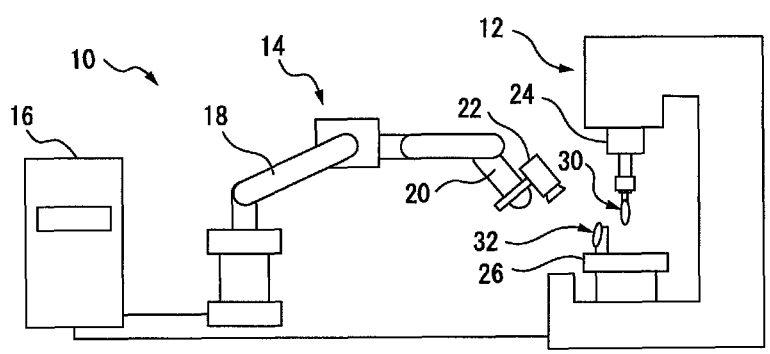
FIG. 10 is a view showing a schematic configuration of a cooperation system according to a second embodiment of the present invention.

As shown in FIG. 10, the configuration of a cooperation system of the second embodiment may be the same as the first embodiment, except that first calibration marker 30 can be replaced with a measurement probe, such as measurement probe 28 as explained in the first embodiment. Therefore, to the components of the second embodiment corresponding to the components of the first embodiment, the same reference numerals are added, and detailed explanations thereof will be omitted.

In the second embodiment, following definitions or conditions (b1) to (b7) are predetermined. Conditions (b1) to (b5) are substantially the same as (a1) to (a5) in the first embodiment.

Figure 11:
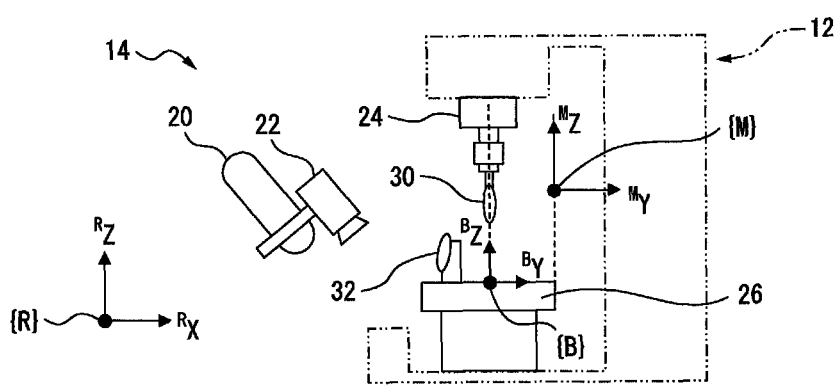
FIG. 11 is a view showing a state of the cooperation system of FIG. 10, in which each coordinate system is defined.

(b1) As shown in FIG. 11, a (machine) coordinate system defined with respect to machine tool 12 is referred to as {M}, and a (robot) coordinate system defined with respect to robot 14 is referred to as {R}.

(b2) Although each of machine coordinate system {M} and robot coordinate system {R} is an orthogonal (Cartesian) coordinate system including three axes (x, y, z) orthogonal to each other. However, coordinate system {M} and/or {R} may be a polar coordinate system. In machine coordinate system {M} as shown in FIG. 11, the X-axis is perpendicular to the drawing sheet, the Y-axis extends in the right-left (horizontal) direction, and the Z-axis extends in the up-down (vertical) direction. On the other hand, in robot coordinate system {R}, the X-axis extends in the right-left (horizontal) direction, the Y-axis is perpendicular to the drawing sheet, and the Z-axis extends in the up-down (vertical) direction.

(b3) The origin of machine coordinate system {M} is fixed to table 26. Regarding the position of the origin (x, y, z), the position of a far-left and back corner of table 26 viewed from robot 14 (see FIG. 12) is defined as (x, y)=(0, 0), and the z-coordinate of the origin is zero (z=0) when a tool center point (TCP) of a tool (not shown) attached to spindle 24 is positioned at a tool exchange position. However, the position of the origin and the direction of the reference axes are not limited as described above.

(b4) Each of machine coordinate system {M}, robot coordinate system {R}, and a camera coordinate system defined with respect to camera 22 is previously calibrated. In addition, the positional relationship between robot coordinate system {R} and the camera coordinate system (a coordinate transformation means) is previously known or calculated.

(b5) As shown in FIG. 11, a machine base coordinate system {B} is defined with respect to a predetermined position of machine tool 12 (for example, table 26), in order to facilitate the calculation. As exemplified in FIG. 11, machine base coordinate system (hereinafter, also referred to as merely base coordinate system) {B} has the origin at an intersection point between the center axis of spindle 24 and an (upper) surface of table 26, and the direction of each reference axis (x, y, z) of base coordinate system {B} coincides with respective axis of machine coordinate axis M. In other words, base coordinate system {B} is obtained by translating machine coordinate system {M}.

(b6) First calibration marker 30 can be attached to spindle 24 in the same manner as the tool, and the center point of the marker is positioned on the axis of the spindle.

(b7) First calibration marker 30 can be replaced with the measurement probe.

Next, under the above definitions or conditions, a procedure for obtaining a coordinate transformation matrix T for carrying out coordinate transformation from robot coordinate system {R} to base coordinate system {B} in cooperation system 10 of the second embodiment will be explained, with reference to FIGS. 10 to 12.

First, similarly to the first embodiment, the measurement probe is attached to spindle 24 of machine tool 12, and the position of second calibration marker 32 attached to table 26 is measured by the measurement probe. Due to this measurement, a position $^{M}P_{M41}$ of second calibration marker 32 in machine coordinate system {M} is obtained. After that, the measurement probe is replaced with first calibration marker 30.

Similarly to FIG. 6, after spindle 24 is moved to an arbitrary position, first calibration marker 30 is captured by camera 22 arranged on robot 14 so as to measure (obtain) first position $^{R}P_{u1}$ in robot coordinate system {R}. Then, after spindle 24 is moved to another arbitrary position, first calibration marker 30 is captured by camera 22 so as to measure (obtain) second position $^{R}P_{u2}$ in robot coordinate system {R} (concretely, robot 14 is controlled so that first calibration marker 30 is positioned within the field of view of camera 22 and the position of marker 30 can be measured with sufficient accuracy). Then, after spindle 24 is moved to another arbitrary position, first calibration marker 30 is captured by camera 22 so as to measure (obtain) second position $^{R}P_{u2}$ in robot coordinate system {R}.

Next, similarly to FIG. 8, table 26 is moved to an arbitrary position. In this regard, the center of second calibration marker 32 is not overlapped with the center axis of spindle 24. At this point, by using coordinate value $^{M}P_{M41}$ of second calibration marker 32 in machine coordinate system {M}, the position of second calibration marker 32 in machine coordinate system {M} is calculated and transformed to a coordinate value in base coordinate system {B}, and a transformed coordinate value $^{B}P_{M2}$ is obtained. Coordinate value $^{B}P_{M2}$ is transmitted to robot controller 16 by using a proper means.

Then, robot 14 is operated by robot controller 16 so that the distance between second calibration marker 32 attached to table 26 and camera 22 attached to the front end of robot 14 becomes appropriate, and the position of second calibration marker 32 can be measured with sufficient accuracy. After that, second calibration marker 32 is captured by camera 22, and the position (or the measurement value) $^{R}P_{M2}$ of second calibration marker 32 in robot coordinate system {R} is obtained.

In this regard, a straight line passing through first position $^{R}P_{u1}$ and second position $^{R}P_{u2}$ of first calibration marker 30 is defined as a Z-axis, and a plane S is calculated so that plane S is orthogonal to Z-axis and includes position $^{R}P_{M2}$. Then, an intersection point between plane S and Z-axis is defined as the origin, and a direction from the origin to point $^{R}P_{u1}$ is defined as +Z direction.

Figure 12:
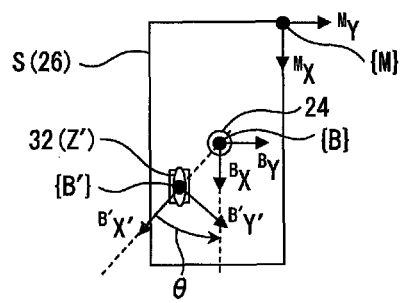
FIG. 12 is a view explaining a process for calculating a coordinate transformation matrix from a robot coordinate system to a machine coordinate system in the second embodiment.

Next, as shown in FIG. 12, a provisional X'-axis is defined so that a positive direction thereof is from the origin of plane S to position $^{R}P_{M2}$ of second calibration marker 32, and a provisional coordinate system {B'} is defined by X'-axis, a Y'-axis extending along plane S and orthogonal to X'-axis, and a Z'-axis orthogonal to both X'- and Y'-axes. By virtue of this, a coordinate transformation matrix T' from robot coordinate system {R} to coordinate system {B'} can be obtained. However, the method for defining coordinate system {B'} is not limited as described above.

Further, based on the x- and y-components of position $^{B}P_{M2}$ of second calibration marker 32 in base coordinate system {B}, a rotational transformation matrix $^{B}R$, for rotating this position by an angle θ so that the position is overlapped with +X direction of base coordinate system {B}, is calculated.

In this regard, as shown in FIG. 12, Z'-axis of provisional coordinate system {B'} is parallel to the Z-axis of base coordinate system {B}. Therefore, a coordinate transformation matrix T from robot coordinate system {R} to base coordinate system {B} can be calculated based on coordinate transformation matrix T' and rotational transformation matrix $^B$R.

In the second embodiment, coordinate transformation matrix T can be obtained by using: the measurement values of arbitrary two positions of first calibration marker 30 attached to spindle 24 in robot coordinate system {R}; and one measurement value of second calibration marker 32 on table 26 in each of robot coordinate system {R} and base coordinate system {B}. As explained above, it is sufficient that the arbitrary one position on table 26 is measured, and thus an allocable area for robot 14 can be enlarged. In the second embodiment, it is not necessary to consider the amount of offset as in the first embodiment, whereas it is necessary that first calibration marker 30 is configured to be attached to spindle 24 as the tool.

Next, a third embodiment of the present invention will be explained, with reference to FIGS. 13 to 14.

Figure 13:
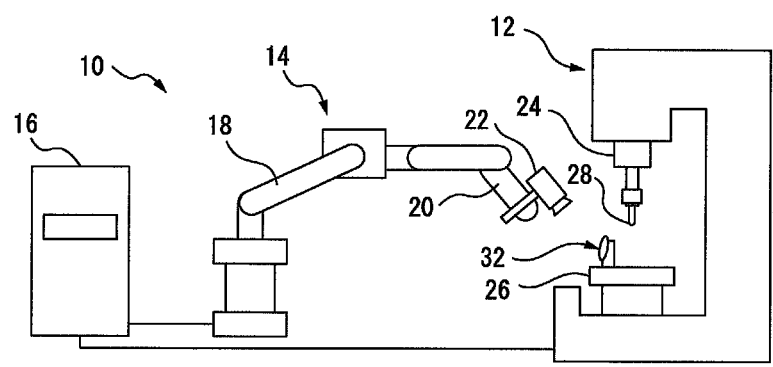
FIG. 13 is a view showing a schematic configuration of a cooperation system according to a third embodiment of the present invention.

As shown in FIG. 13, the configuration of a cooperation system of the third embodiment may be the same as the first or second embodiment, except that the first calibration marker is not used. Therefore, to the components of the third embodiment corresponding to the components of the first embodiment, the same reference numerals are added, and detailed explanations thereof will be omitted.

In the third embodiment, following definitions or conditions (c1) to (c5) are predetermined. Conditions (c1) to (c5) are substantially the same as (a1) to (a5) in the first embodiment.

Figure 14:
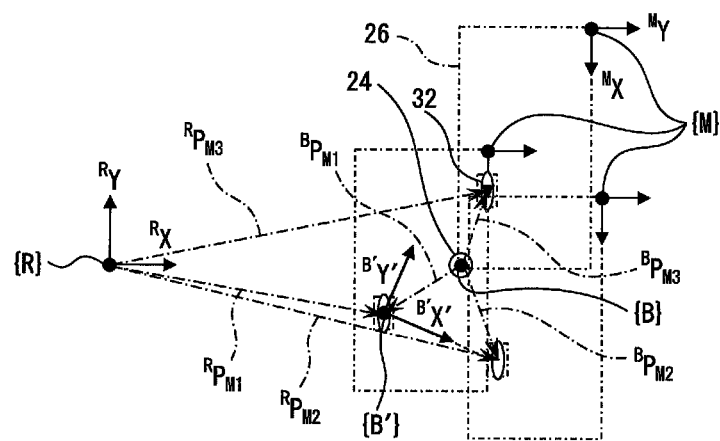
FIG. 14 is a view explaining a process for calculating a coordinate transformation matrix from a robot coordinate system to a machine coordinate system in the third embodiment.

(c1) As shown in FIG. 14, a (machine) coordinate system defined with respect to machine tool 12 is referred to as {M}, and a (robot) coordinate system defined with respect to robot 14 is referred to as {R}.

(c2) Although each of machine coordinate system {M} and robot coordinate system {R} is an orthogonal (Cartesian) coordinate system including three axes (x, y, z) orthogonal to each other. However, coordinate system {M} and/or {R} may be a polar coordinate system. In machine coordinate system {M} as shown in FIG. 14, the X-axis extends in the up-down (vertical) direction, the Y-axis extends in the right-left (horizontal) direction, and the Z-axis is perpendicular to the drawing sheet. On the other hand, in robot coordinate system {R}, the X-axis extends in the right-left (horizontal) direction, the Y-axis extends in the up-down (vertical) direction, and the Z-axis is perpendicular to the drawing sheet.

(c3) The origin of machine coordinate system {M} is fixed to table 26. Regarding the position of the origin (x, y, z), the position of a far-left and back corner of table 26 viewed from robot 14 (see FIG. 14) is defined as (x, y)=(0, 0), and the z-coordinate of the origin is zero (z=0) when a tool center point (TCP) of a tool (not shown) attached to spindle 24 is positioned at a tool exchange position. However, the position of the origin and the direction of the reference axes are not limited as described above.

(c4) Each of machine coordinate system {M}, robot coordinate system {R}, and a camera coordinate system defined with respect to camera 22 is previously calibrated. In addition, the positional relationship between robot coordinate system {R} and the camera coordinate system (a coordinate transformation means) is previously known or calculated.

(c5) As shown in FIG. 14, a machine base coordinate system {B} is defined with respect to a predetermined position of machine tool 12 (for example, table 26), in order to facilitate the calculation. As exemplified in FIG. 14, machine base coordinate system (hereinafter, also referred as merely base coordinate system) {B} has the origin at an intersection point between the center axis of spindle 24 and an (upper) surface of table 26, and the direction of each reference axis (x, y, z) of base coordinate system {B} coincides with respective axis of machine coordinate axis {M}. In other words, base coordinate system {B} is obtained by translating machine coordinate system M.

Next, under the above definitions or conditions, a procedure for obtaining a coordinate transformation matrix T for carrying out coordinate transformation from robot coordinate system {R} to base coordinate system {B} in cooperation system 10 of the third embodiment will be explained.

First, similarly to the first embodiment, the position of second calibration marker 32 attached to table 26 is measured by measurement probe 28 attached to spindle 24 of machine tool 12. Due to this measurement, a position $^M P_{MA1}$ of second calibration marker 32 in machine coordinate system {M} is obtained.

Next, table 26 is moved to an arbitrary position. In this regard, the center of second calibration marker 32 is not overlapped with the center axis of spindle 24. At this point, by using coordinate value $^M P_{MA1}$ of second calibration marker 32 in machine coordinate system {M}, the position of second calibration marker 32 in machine coordinate system {M} is calculated and transformed to a coordinate value in base coordinate system {B}, and a transformed coordinate value $^B P_{M1}$ is obtained. Coordinate value $^B P_{M1}$ is transmitted to robot controller 16 by using a proper means.

Then, robot 14 is operated by robot controller 16 so that the distance between second calibration marker 32 attached to table 26 and camera 22 attached to the front end of robot 14 becomes appropriate, and the position of second calibration marker 32 can be measured with sufficient accuracy. After that, second calibration marker 32 is captured by camera 22, and the position (or the measurement value) $^R P_{M1}$ of second calibration marker 32 in robot coordinate system {R} is obtained.

Due to the above operation, one set of positions of second calibration marker 32 in robot coordinate system {R} and base coordinate system {B} (i.e., a position set ($^B P_{M1}$, $^R P_{M1}$)) is obtained. As shown in FIG. 14, the operation for obtaining the position set is further carried out twice while changing the position of table 26, so that two set of positions of second calibration marker 32 (i.e., position sets ($^B P_{M2}$, $^R P_{M2}$) and ($^B P_{M3}$, $^R P_{M3}$)) are obtained.

Based on three coordinates ($^R P_{M1}$, $^R P_{M2}$, $^R P_{M3}$) of second calibration marker 32 on robot coordinate system {R} obtained as described above, one plane can be defined. An axis perpendicular to the this plane is parallel to the Z-axis of base coordinate system {B}, and a direction toward one of three coordinates ($^B P_{M1}$, $^B P_{M2}$, $^B P_{M3}$) in base coordinate system {B} is defined as +Z direction.

Next, as shown in FIG. 14, a provisional X'-axis is defined so that a positive direction thereof is from one arbitrary position determined as the origin of the above plane (in this case, position $^R P_{M1}$) to position $^R P_{M2}$, and a provisional coordinate system {B'} is defined by X'-axis, a Y'-axis extending along the plane defined by the three coordinates in robot coordinate system {R} and orthogonal to X'-axis, and a Z'-axis orthogonal to both X'- and Y'-axes. By virtue of this, a coordinate transformation matrix T' for carrying out the coordinate transformation from robot coordinate system {R} to coordinate system {B'} can be obtained. The Z-axis of base coordinate system {B} and the Z'-axis of provisional coordinate system {B'} are parallel to each other, and the positive directions of the axes coincide with each other.

However, the method for defining coordinate system {B'} is not limited as described above.

Next, a difference (or a vector) from position $^{B}P_{M1}$ to position $^{B}P_{M2}$ is calculated, and a rotational transformation matrix $^{B}R'$ is calculated so that the vector coincides with a straight line representing the positive direction of the X-axis of base coordinate system {B}. Based on coordinate transformation matrix T' and rotational transformation matrix $^{B}R'$, a coordinate transformation matrix T" for the coordinate transformation from robot coordinate system {R} to provisional coordinate system {B"} is obtained.

Coordinate system {B"} and base coordinate system {B} are in parallel relationship, and a translational distance and direction between coordinate systems {B"} and {B} are calculated based on coordinate value $^{B}P_{M1}$. Therefore, by using coordinate value $^{B}P_{M1}$ and coordinate transformation matrix T", coordinate transformation matrix T for parallel translation from robot coordinate system {R} to base coordinate system {B} can be obtained.

In the third embodiment, coordinate transformation matrix T can be obtained by using the three measurement values (or the sets of position) of second calibration marker 32 on table 26 in each of robot coordinate system {R} and base coordinate system {B}. Since the first calibration marker attached to spindle 24 is not necessary in the third embodiment, it is not necessary to move camera 22 close to spindle 24 in order to measure the marker. By virtue of this, an allocable area for robot 14 can be enlarged.

Figure 15:
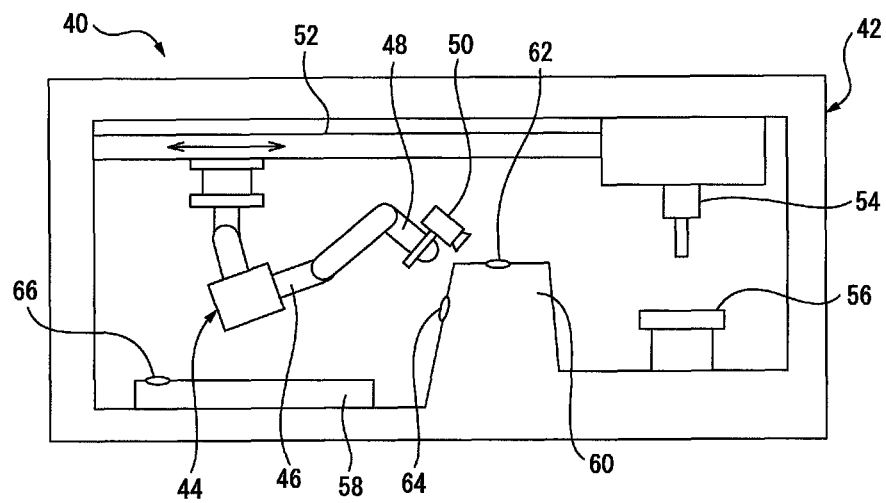
FIG. 15 is a view showing a schematic configuration of a cooperation system according to a fourth embodiment of the present invention.

Next, a fourth embodiment of the present invention will be explained, with reference to FIGS. 15 to 18. As shown in FIG. 15, a cooperation system 40 of the fourth embodiment has a machine tool 42 such as a machining center; a robot 44 configured to carry out an operation with respect to machine tool 42 such as handling of an object to be processed by machine tool 42; and a robot controller configured to control the motion of robot 44. Although the robot controller is not shown, the robot controller is connected to machine tool 42 or a controller of the machine tool.

For example, robot 44 is a multi-joint robot having six axes, and has a movable portion such as an arm 46 or a hand 48 attached to a front end of arm 46, and a camera 50 attached to the movable portion (preferably, a front end of hand 48). Robot 44 is attached to a gantry axis 52 arranged in machine tool 42, and robot 44 is movable along gantry axis 52.

Machine tool 42 has a spindle 54 configured to grip a tool and rotate about a center axis (in the generally vertical direction in the drawing); and a movable portion or table 56 on which an object (or a workpiece) to be processed by machine tool 42 can be mounted. At least three calibration markers are arranged at predetermined different positions (preferably, fixed positions) in machine tool 42. In the illustrated embodiment, an inner area of machine tool 42 is divided into a process area including spindle 54 and a robot operation area including a work table where robot 44 is operated, by using a partition 60 for preventing scatter of cutting oil or chips from the process area. On the different positions (in the drawing, an upper surface and a side surface) of partition 60, a first calibration marker 62 and a second calibration marker 64 are formed. Further, a third calibration marker 66 if formed on work table 58.

In the fourth embodiment, following definitions or conditions (d1) to (d6) are predetermined. Conditions (d1) to (d5) are substantially the same as (a1) to (a5) in the first embodiment.

Figure 16:
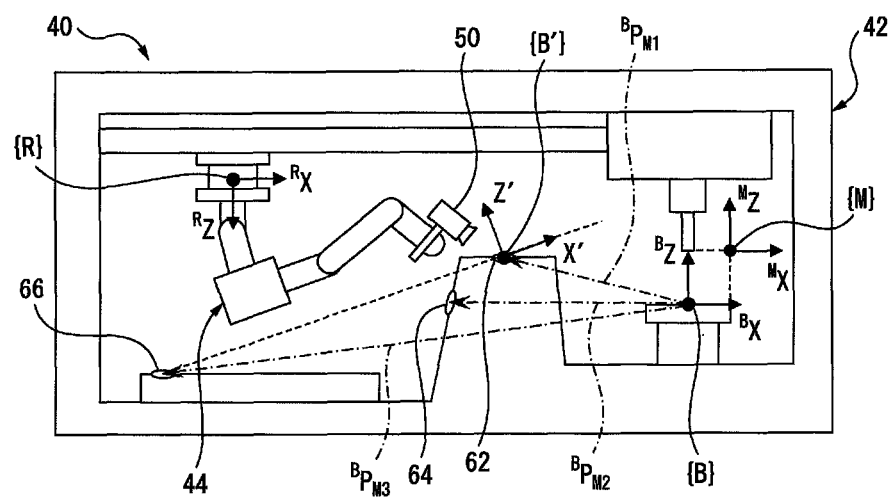
FIG. 16 is a view showing a state of the cooperation system of FIG. 15, in which each coordinate system is defined.

(d1) As shown in FIG. 16, a (machine) coordinate system defined with respect to machine tool 42 is referred to as {M}, and a (robot) coordinate system defined with respect to robot 44 is referred to as {R}.

(d2) Although each of machine coordinate system {M} and robot coordinate system {R} is an orthogonal (Cartesian) coordinate system including three axes (x, y, z) orthogonal to each other. However, coordinate system {M} and/or {R} may be a polar coordinate system. In machine coordinate system {M} as shown in FIG. 16, the X-axis extends in the right-left (horizontal) direction, the Y-axis is perpendicular to the drawing sheet, and the Z-axis extends in the up-down (vertical) direction. On the other hand, in robot coordinate system {R}, the X-axis extends in the right-left (horizontal) direction, the Y-axis is perpendicular to the drawing sheet, and the Z-axis extends in the up-down (vertical) direction.

(d3) The origin of machine coordinate system {M} is fixed to table 56. Regarding the position of the origin (x, y, z), the position of a far-left and back corner of table 56 viewed from robot 44 is defined as (x, y)=(0, 0), and the z-coordinate of the origin is zero (z=0) when a tool center point (TCP) of a tool (not shown) attached to spindle 54 is positioned at a tool exchange position.

(d4) Each of machine coordinate system {M}, robot coordinate system {R}, and a camera coordinate system defined with respect to camera 50 is previously calibrated. In addition, the positional relationship between robot coordinate system {R} and the camera coordinate system (a coordinate transformation means) is previously known or calculated.

(d5) As shown in FIG. 16, a machine base coordinate system {B} is defined with respect to a predetermined position of machine tool 42 (for example, table 56), in order to facilitate the calculation. As exemplified in FIG. 16, machine base coordinate system (hereinafter, also referred as merely base coordinate system) {B} has the origin at an intersection point between the center axis of spindle 54 and an (upper) surface of table 56, and the direction of each reference axis (x, y, z) of base coordinate system {B} coincides with respective axis of machine coordinate axis {M}. In other words, base coordinate system {B} is obtained by translating machine coordinate system {M}.

(d6) In base coordinate system {B}, the positions (coordinate values) of the three calibration markers arranged in machine tool 42 are previously known. In this regard, a coordinate vectors of the first, second and third calibration markers from the origin of base coordinate system {B} are represented by $^{B}P_{M1}$, $^{B}P_{M2}$ and $^{B}P_{M3}$, respectively.

Next, under the above definitions or conditions, a procedure for obtaining a coordinate transformation matrix T for carrying out coordinate transformation from robot coordinate system {R} to base coordinate system {B} in cooperation system 40 will be explained, with reference to FIGS. 15 to 18.

Figure 17:
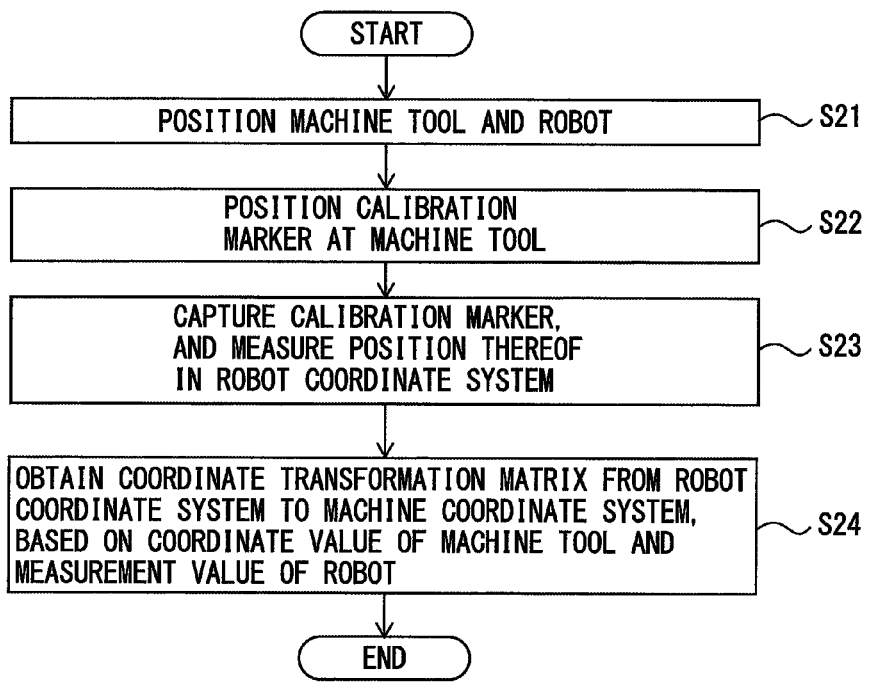
FIG. 17 is a flowchart showing an example of a procedure in the fourth embodiment.

First, as shown in FIG. 15, machine tool 42 and robot 44 are positioned at predetermined positions (step S21 in FIG. 17), and then, first, second and third calibration markers 62, 64 and 66 are formed or arranged, on the predetermined positions (in this case, partition 60 and work table 58) of machine tool 42 (step S22 in FIG. 17).

Since coordinate values $^{B}P_{M1}$, $^{B}P_{M2}$ and $^{B}P_{M3}$ of the three calibration markers in base coordinate system {B} are previously known, a provisional coordinate system {B'} is defined by using the coordinate values, and then, a coordinate transformation matrix $T_B$ from provisional coordinate system {B'} to robot coordinate system {B} is calculated. In this case, as shown in FIG. 16, provisional coordinate system {B'} can be defined by specifying a plane by three points $^{B}P_{M1}$, $^{B}P_{M2}$ and $^{B}P_{M3}$, and by setting position $^{B}P_{M1}$ of first calibration marker 62 as the origin of coordinate system {B'}, so that coordinate system {B'} includes a provisional X'-axis extending along the plane and in a direction opposed to a direction from the origin to position $^{B}P_{M3}$, a provisional Z'-axis extending along the plane and orthogonal to X'-axis, and a provisional Y'-axis orthogonal to both X'- and Z'-axes. However, the method for defining coordinate system {B'} is not limited as described above. For example, another provisional coordinate system having the origin corresponding to position $^{B}P_{M2}$ or $^{B}P_{M3}$ may be defined.

Figure 18:
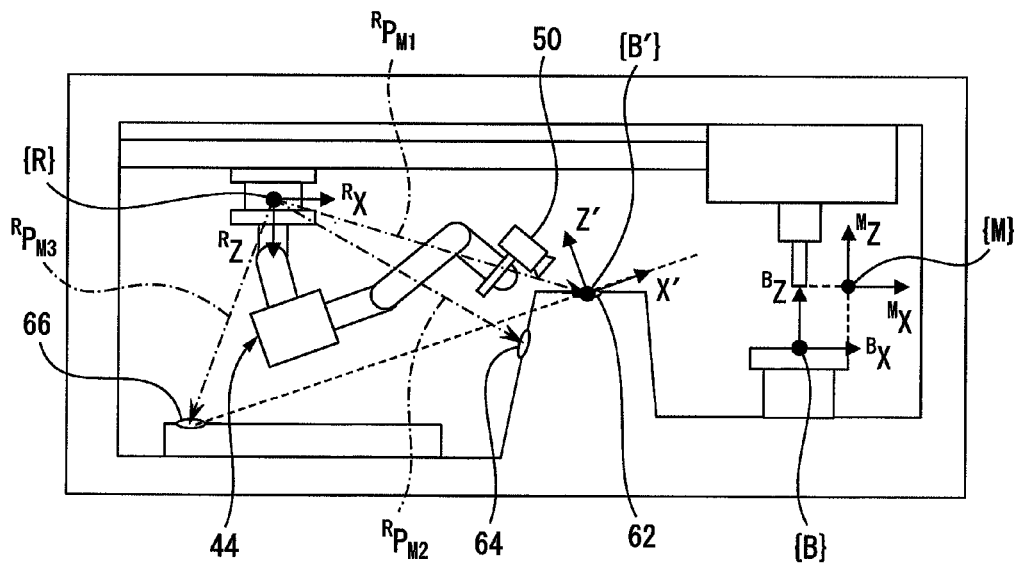
FIG. 18 is a view explaining a process for calculating a coordinate transformation matrix from a robot coordinate system to a machine coordinate system in the fourth embodiment.

Next, as shown in FIG. 18, first calibration marker 62 is captured by camera 50 arranged on robot 44 (concretely, robot 44 is controlled so that first calibration marker 62 is positioned within the field of view of camera 50). Due to this operation, position $^{R}P_{M1}$ of first calibration marker 62 in robot coordinate system {R} is obtained. Similarly, second calibration marker 64 is captured by camera 50 so as to obtain position $^{R}P_{M2}$ of second calibration marker 64 in robot coordinate system {R}, and third calibration marker 66 is captured by camera 50 so as to obtain position $^{R}P_{M3}$ of third calibration marker 66 in robot coordinate system {R} (step S23 in FIG. 17).

By using three coordinate values ($^{R}P_{M1}$, $^{R}P_{M2}$, $^{R}P_{M3}$) of the three calibration markers in robot coordinate system {R} obtained by camera 50, a coordinate transformation matrix $T_R$ from robot coordinate system {R} to provisional coordinate system {B'} is calculated. Further, by using coordinate transformation matrix $T_R$ and coordinate transformation matrix $T_B$ as described above, a coordinate transformation matrix T from robot coordinate system {R} to base coordinate system {B} is calculated (step S24 in FIG. 17). In other words, (T=$T_R(T_B)^{-1}$) is true (in this regard, "$(T_B)^{-1}$" is referred to an inverse matrix of $T_B$).

In the fourth embodiment, at least three calibration markers are arranged so that the positions thereof in the coordinate system defined with respect to the predetermined position of the machine tool are previously known, whereby a coordinate system common to the robot and the machine tool can be obtained merely by measuring the calibration markers by using the camera of the robot. Depending on the positions of the calibration markers, it is not necessary to move the robot close to the spindle or the work table of the machine tool. Therefore, the motion range of the robot can be appropriately determined corresponding to contents of the operation of the robot (for example, the robot can be operated only in a robot operation area defined by the partition), whereby an allocable area for the robot can be enlarged.

Figure 19:
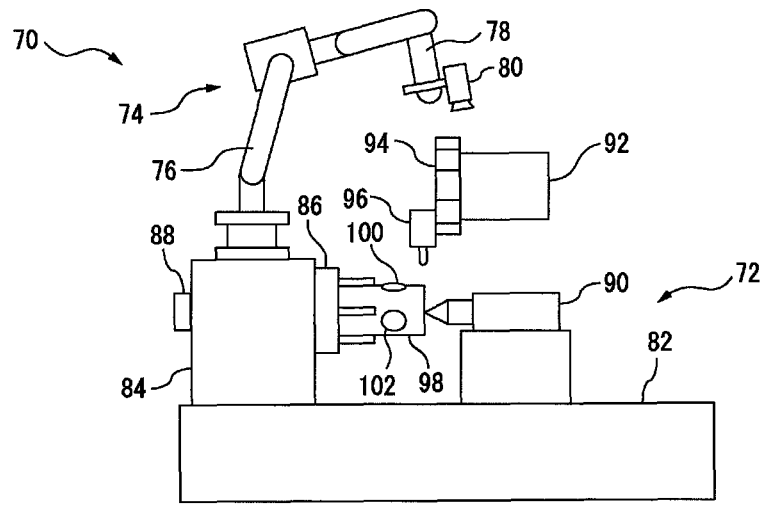
FIG. 19 is a view showing a schematic configuration of a cooperation system according to a fifth embodiment of the present invention.

Next, a fifth embodiment of the present invention will be explained, with reference to FIGS. 19 to 22. As shown in FIG. 19, a cooperation system 70 of the fifth embodiment has a machine tool 72 (an NC lathe in the drawing) and a robot 74 configured to carry out an operation with respect to machine tool 72 such as handling of an object to be processed by machine tool 72. For example, robot 74 is a multi-joint robot having six axes, and has a robot movable portion such as an arm 76 or a hand 78 attached to a front end of arm 76, and a camera 80 attached to the robot movable portion (preferably, a front end of hand 78). Although the robot controller is not shown, the robot controller is connected to NC lathe 72.

Machine tool 72 has a bed 82; a spindle stock 84 arranged on bed 82; a spindle 88 rotatably arranged in spindle stock 84 (about a horizontal axis in the drawing) and having a chuck 86 for gripping a tool; a tailstock 90 arranged on bed 82; a cross slide 92 moveable relative to bed 82; and a tool rest turret 94 arranged on cross slide 92. In the fifth embodiment, robot 74 is mounted on spindle stock 84, and a measurement probe 96 is (detachably in many cases) attached to tool rest turret 94 in the same manner as the tool. A marker jig 98 having at least three calibration markers can be attached to chuck 86.

In the fifth embodiment, following definitions or conditions (e1) to (e5) are predetermined.

Figure 20:
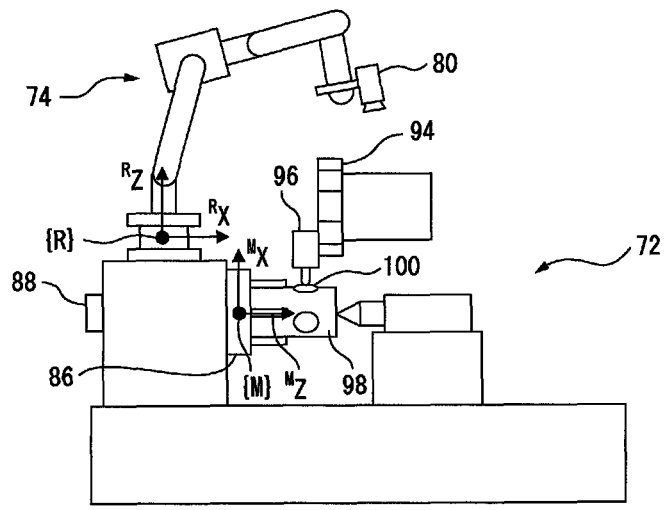
FIG. 20 is a view showing a state of the cooperation system of FIG. 19, in which each coordinate system is defined.

(e1) As shown in FIG. 20, a (machine) coordinate system defined with respect to NC lathe 72 is referred to as {M}, and a (robot) coordinate system defined with respect to robot 74 is referred to as {R}.

(e2) The origin of machine coordinate system {M} is fixed to a center axis of spindle 88, and the orientation of machine coordinate system {M} conforms to JIS B6310. In FIG. 20, the upward direction corresponds to the positive direction of X-axis of machine coordinate system {M}.

(e3) Each of machine coordinate system {M}, robot coordinate system {R}, and a camera coordinate system defined with respect to camera 80 is previously calibrated. In addition, the positional relationship between robot coordinate system {R} and the camera coordinate system (a coordinate transformation means) is previously known or calculated.

Figure 21A:
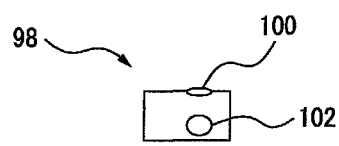
FIG. 21a is a front view of a jig with a calibration marker used in the fifth embodiment.
Figure 21B:
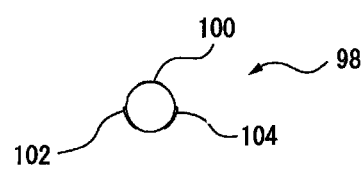
FIG. 21b is a side view of the jig with the calibration marker used in the fifth embodiment.

(e4) As shown in FIGS. 21a and 21b, a body of marker jig 98 has a generally cylindrical shape, and first, second and third calibration markers 100, 102 and 104 are formed on different angular positions on the same circumference of the body of marker jig 98. The angular positional relationship between the three markers may be arbitrary, while the three markers are positioned at regular intervals (separated from each other by 120 degrees) in the drawing.

(e5) The positional relationship between three markers 100, 102 and 104 of marker jig 98 is previously known, by preliminary measurement, etc.

Next, under the above definitions or conditions, a procedure for obtaining a coordinate transformation matrix T for carrying out coordinate transformation from robot coordinate system {R} to machine coordinate system {M} in cooperation system 70 will be explained.

First, as shown in FIG. 20, marker jig 98 is attached to chuck 86 of NC lathe 72, and then spindle 88 is fed at low speed until the center of one of the markers of jig 98 (in this case, first calibration marker 100) comes into contact with a front end of the tool (or measurement probe 96). After that, by using measurement probe 96 attached to tool rest turret 94, the position (or coordinate value) of first calibration marker 100 on a Z-X plane of machine coordinate system {M} is measured. In this regard, since the positional relationship between the first, second and third markers is known, the positions (or coordinate values) of second and third calibration markers 102 and 104 can be calculated by measuring the position of first calibration marker 100 and by using the positional relationship between the markers.

Based on the three coordinate values (of the three calibration markers) obtained with respect to machine coordinate system {M}, a provisional coordinate system {M'} is defined, and a coordinate transformation matrix $T_M$ for the coordinate transformation from machine coordinate system {M} to coordinate system {M'} is calculated. Since a method for defining coordinate system WI may be the same as the definition of provisional coordinate system {B'} in the third or fourth embodiment, a detail of the method will be omitted.

Figure 22:
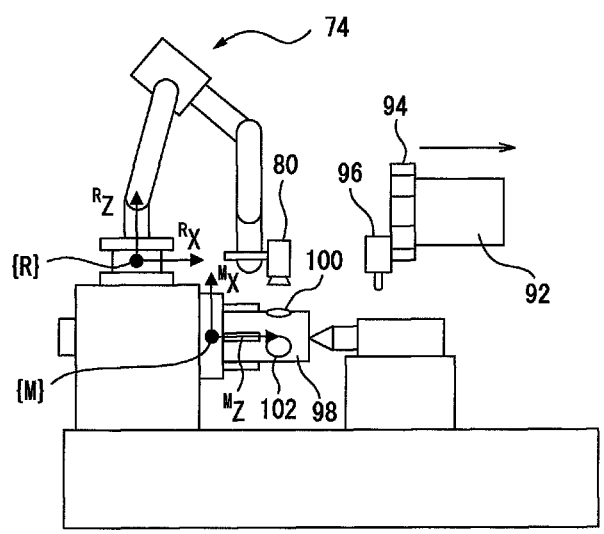
FIG. 22 is a view showing a state in the fifth embodiment, in which the position of the calibration marker is measured by the camera.

Next, as shown in FIG. 22, tool rest turret 94 (or cross slide 92) is retracted from spindle 88, and robot 74 is controlled so that the distance between first calibration marker 100 and camera 80 attached to the front end of robot 74 becomes appropriate, and the position of first calibration marker 100 can be measured with sufficient accuracy. Then, first calibration marker 100 is captured by camera 80, and the position (or the measurement value) of first calibration marker 100 in robot coordinate system {R} is obtained. Similarly, the positions of second and third calibration markers 102 and 104 in robot coordinate system {R} are measured by using camera 80.

The three calibration markers of marker jig 98 can be attached to the jig at arbitrary angular intervals, as long as the three markers are positioned on the same circumference with respect to the center axis of spindle 88. However, it is preferable that the angular intervals of the three markers be determined so that camera 88 attached to robot 74 can easily measure the position of each marker.

Based on the three coordinate values (of the three calibration markers) obtained with respect to robot coordinate system {R}, a coordinate transformation matrix $T_R$ for the coordinate transformation from robot coordinate system {R} to coordinate system {M'} is calculated.

By using coordinate transformation matrix $T_M$ and coordinate transformation matrix $T_R$ as described above, a coordinate transformation matrix T from robot coordinate system {R} to machine coordinate system {M} is calculated. In other words, $(T=T_R(T_M)^{-1})$ is true (in this regard, "$(T_M)^{-1}$" is referred to an inverse matrix of $T_M$).

In the fifth embodiment, the jig having the calibration markers is used so as to obtain the three coordinate values in machine coordinate system {M} and the corresponding three coordinate values in robot coordinate system {R}, whereby the coordinate transformation matrix for coordinate transformation from the robot to the machine tool (or the NC lathe) can be obtained. Since it does not mean that the robot merely obtains the coordinate system of the object (the workpiece) to be processed, the robot can carry out an operation other than the handling of the object, such as checking or evaluating of the NC lathe, or cleaning of cutting chips, etc.

When NC lathe 72 is a turning center, marker jig 98 may have only one calibration marker, since the turning center has a function for indexing the spindle (or a C-axis feeding function). Concretely, one calibration marker is measured by measurement probe 96 (in machine coordinate system {M}) and by camera 80 (in robot coordinate system {R}), and then primary C-axis feeding (or rotation about Z-axis) is carried out. Based on an amount of feed in the primary C-axis feeding, the position of the calibration marker in machine coordinate system {M} is calculated, and the calibration marker is measured by camera 80. Further, secondary C-axis feeding is carried out, and then, based on an amount of feed in the secondary C-axis feeding, the position of the calibration marker in machine coordinate system {M} is calculated, and the calibration marker is measured by camera 80. By virtue of this, three sets of coordinate values of the calibration marker, each set including the coordinate value in machine coordinate system {M} and the coordinate value in robot coordinate system {R}, are obtained, whereby coordinate transformation matrix T can be calculated.

In each embodiment as explained above, the robot controller can automatically control the robot so that the positional relationship between the camera and the calibration marker is adapted for the measurement of the position of the calibration marker by using the camera. Concretely, when the robot should be controlled so that the distance between the calibration marker and the camera of the robot becomes appropriate, the calibration marker may be captured by the camera before the robot is operated (i.e., the robot is positioned at an initial position), and the robot may be controlled so that the robot automatically approaches the calibration marker by using the captured information. For example, the technique described in JP 2009-279677 A may be used. Due to this, a series of motions for measuring the position of the calibration marker in the robot coordinate system may be automated, whereby workload of the operator can be reduced.

According to the present invention, the coordinate transformation means, from the robot coordinate system defined with respect to the robot to the machine coordinate system defined with respect to the predetermined position of the machine tool, can be obtained with high accuracy by the simple configuration. Therefore, a robot program, for carrying out various operations including the handling of the object with respect to the machine tool, can be easily generated. Further, the allocable area for the robot can be enlarged, and a non-linear modeling error, which cannot be considered in an offline simulation device, can be reduced.

According to the present invention, the coordinate system common to the robot and the machine tool can be obtained. Therefore, when the robot and the machine tool have respective three-dimensional CAD models, it can be checked as to whether interference between the robot and the machine tool occurs, by obtaining information regarding the machine tool during the operation of the robot. In this regard, since the robot can be informed of the positioning status of the object in the machine tool, it may not be necessary to move the robot to a safe position during the machine tool is operated, and in this case, the machine tool can be operated without waiting until the movement of the robot is completed, whereby work efficiency of the cooperation system can be improved. Further, since the three-dimensional CAD model information can be used in the robot, the machine tool can be automatically inspected by the camera attached to the robot, when an abnormality occurs in the machine tool.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A cooperation system, the cooperation system comprising:
   a machine tool having a machine coordinate system defined with respect to a machine tool;
   a robot for carrying out an operation with respect to the machine tool, the robot having a robot coordinate system defined with respect to the robot, and distinct from the machine coordinate system;
   a camera attached to a movable portion of the robot;
   at least one calibration marker arranged on the machine tool;
   a first marker coordinate obtaining part arranged on the machine tool which obtains a first coordinate value of the calibration marker in the machine coordinate system, by detecting a position of the calibration marker with respect to a position of the machine tool;
   a second marker coordinate obtaining part arranged on the robot which obtains a second coordinate value of the calibration marker in the robot coordinate system, by capturing the calibration marker by the camera; and
   a coordinate transforming part which calculates a coordinate transformation for transforming the robot coordinate system to the machine coordinate system, based on a plurality of distinct sets of the first and second coordinate values of the calibration marker.

2. The coordinate system as set forth in claim 1, wherein the calibration marker is attached to a movable portion of the machine tool, wherein the first marker coordinate obtaining part obtains a plurality of first coordinate values of the calibration marker in the machine coordinate system, with respect to a plurality of positions of the movable portion of the machine tool, respectively, and wherein the second marker coordinate obtaining part obtains a plurality of second coordinate values of the calibration marker in the robot coordinate system, by capturing the calibration marker at the plurality of positions of the movable portion of the machine tool, respectively.

3. The cooperation system as set forth in claim 1, wherein the robot is automatically controlled so as to determine a positional relationship between the camera and the calibration marker, in which the camera can measure the position of the calibration marker.

\* \* \* \* \*